United States Patent [19]

Lange

[11] Patent Number: 5,768,783
[45] Date of Patent: Jun. 23, 1998

[54] METHOD FOR FABRICATING A FLAT OR CENTRIPETAL WIRE

[75] Inventor: Werner Lange, Nattheim, Germany

[73] Assignee: Voith Sulzer Stoffaufbereitung GmbH, Ravensburg, Germany

[21] Appl. No.: 789,196

[22] Filed: Jan. 24, 1997

Related U.S. Application Data

[63] Continuation of Ser. No. 537,546, Oct. 2, 1995, abandoned.

[30] Foreign Application Priority Data

Oct. 5, 1994 [DE] Germany ............................ 44 35 538.6

[51] Int. Cl.⁶ .................................................. B21D 39/00
[52] U.S. Cl. .................................... 29/897.15; 29/896.62; 29/514; 29/515
[58] Field of Search ............................. 29/896.62, 897.15, 29/509, 514, 515; 220/485; 209/411, 393, 395; 210/232, 402, 497.01

[56] References Cited

U.S. PATENT DOCUMENTS

| | | | |
|---|---|---|---|
| 2,274,125 | 2/1942 | Carney | 29/897.15 |
| 4,846,971 | 7/1989 | Lamort | 29/896.62 |
| 5,090,721 | 2/1992 | Lange | 29/896.62 |
| 5,094,360 | 3/1992 | Lange | 29/896.62 |

*Primary Examiner*—David P. Bryant
*Attorney, Agent, or Firm*—Baker & Daniels

[57] ABSTRACT

Method of making a flat wire of the type comprising a plurality of bars in substantially axially parallel arrangement relative to one another and including wire slots contained inbetween. Said method comprises providing a plurality of bars and providing at least two bar support members. Each bar support member includes laterally open recesses provided along a longitudinal edge of the bar support member. Each bar support member is capable of being flexed from an initial state to a final state. At the initial state, the longitudinal edge has an initial radius of curvature such that the laterally open recesses are open sufficiently to receive the bars and wherein at the final state, the longitudinal edge has a final radius of curvature larger than the initial radius of curvature such that the laterally open recesses are sufficiently closed to exert a clamping force upon the bars retained in said recesses. The bars are inserted into the laterally open recesses of the bar support members while the bar support members are in the initial state in order to provide a wire shell. The bar support members are bent from the initial state to the final state such that the laterally open recesses exert a clamping force upon the bars.

3 Claims, 1 Drawing Sheet

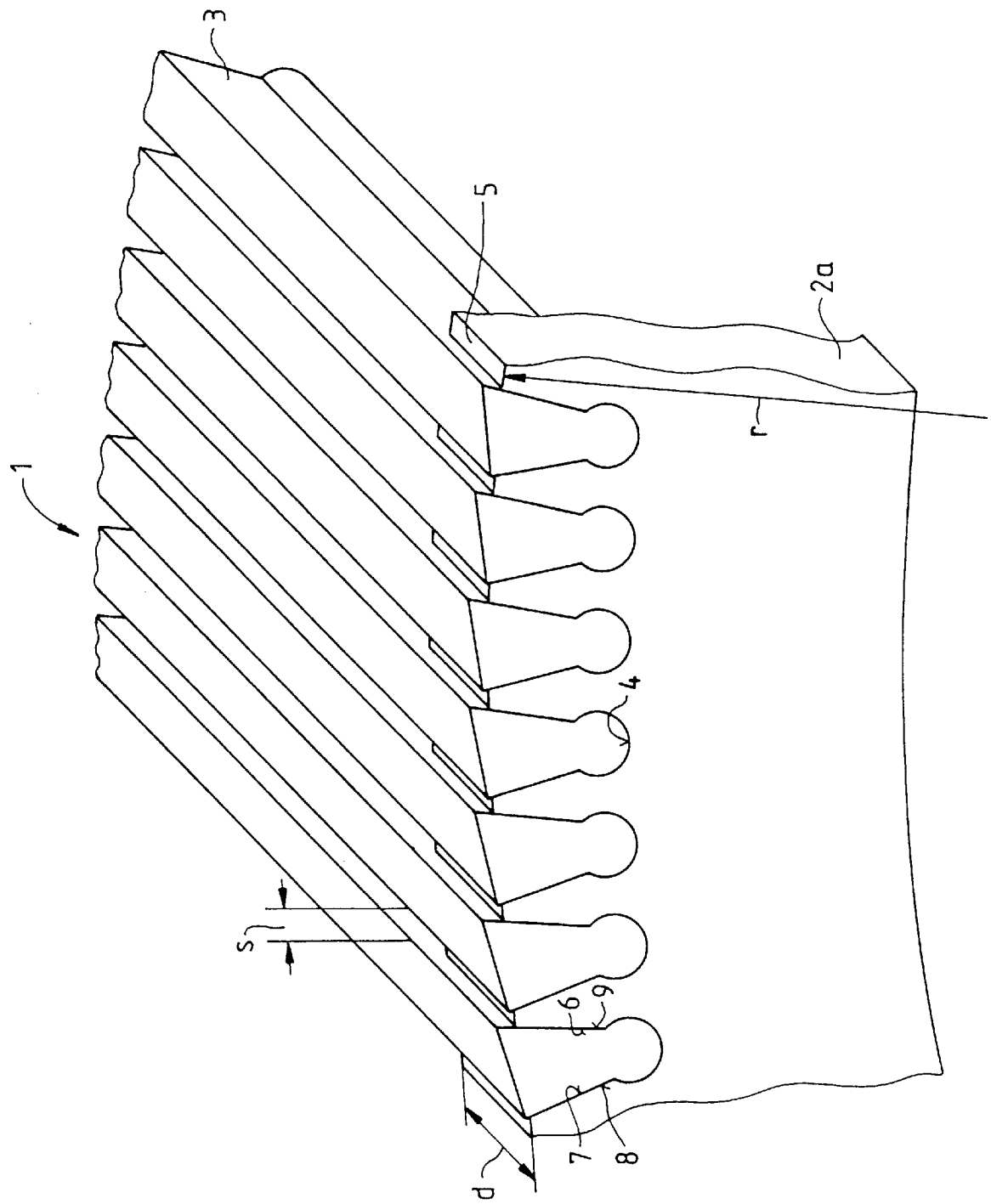

METHOD FOR FABRICATING A FLAT OR CENTRIPETAL WIRE

This is a continuation of application Ser.No. 08/537,546, filed Oct. 2, 1995, now abandoned.

FIELD OF THE INVENTION

The invention concerns a method for fabricating a flat or centripetal wire.

BACKGROUND OF THE INVENTION

In making flat or centripetal wires, fastening the bars on the bar support element is very expensive. The bars are normally arranged on the support element by welding. Welding, however, leads to a number of disadvantages, since welding introduces great tensions in the structural component. Such tensions may lead to distortions of the entire wire body. Furthermore, using welding techniques for fastening is not always guaranteed to work well, since wear phenomena may, under certain circumstances and in the course of time, result in a deterioration of the welding seams. Further, the fabrication itself is very laborious and time-consuming as such. Besides, it is also very difficult to adjust the slot width between two adjacent wire bars accurately.

SUMMARY OF THE INVENTION

Therefore, the objective underlying the invention is to provide a method that avoids said disadvantages.

This objective is accomplished by the mounting of the bars on the support elements of a flat wire being effected positively, by clamping due to plastic deformation of the bar support element(s). An easily realizable fabrication method for wires is thus obtained. Moreover, no further tensions are externally impressed on the overall wire assembly. The present invention also makes it possible to provide extremely small, uniform slot widths between bars, wherein the slots have a relatively slight fluctuation range.

In one aspect, the present invention relates to a method of making a flat wire of the type comprising a plurality of bars in substantially axially parallel arrangement relative to one another and including wire slots contained inbetween. Said method comprises providing a plurality of bars and providing at least two bar support members. Each bar support member includes laterally open recesses provided along a longitudinal edge of the bar support member. Each bar support member is capable of being flexed from an initial state to a final state. At the initial state, the longitudinal edge has an initial radius of curvature such that the laterally open recesses are open sufficiently to receive the bars and wherein at the final state, the longitudinal edge has a final radius of curvature larger than the initial radius of curvature such that the laterally open recesses are sufficiently closed to exert a clamping force upon the bars retained in said recesses. The bars are inserted into the laterally open recesses of the bar support members while the bar support members are in the initial state in order to provide a wire shell. The bar support members are bent from the initial state to the final state such that the laterally open recesses exert a clamping force upon the bars.

In another aspect, the present invention relates to a flat wire characterized in that the flat wire comprises at least two bar support elements comprising a plurality of laterally open recesses provided along a longitudinal edge of the bar support elements. The flat wire also comprises a plurality of bars provided in the laterally open recesses such that the bars are in substantially axially parallel arrangement relative to one another and include wire slots contained inbetween, and such that the laterally open recesses exert a clamping force upon the bars.

Various profile forms can be used for the bars. But a shape is preferably chosen which, in the clamped state, enables a maximally planar contact of the bars with the walls of the recesses in the bar support elements.

For additional security, the bars may be joined to their support elements by a composition of matter, for instance a solder joint.

Bars, or also plates, of specific thickness may be used as bar support elements. The shape and dimensioning of the recesses depends on the bars to be clamped in place and on the ultimate shape, that is, notably the final radius, of the wire.

BRIEF DESCRIPTION OF THE DRAWING

The invention is illustrated in greater detail with the aid of a drawing, FIG. 1, which shows a section of a centripetal wire in its final state.

DETAILED DESCRIPTION OF THE PREFERRED EMBODIMENTS

Referring to the Drawing, the centripetal wire 1 is comprised of at least two bar support elements, of which here - for reason of simplification—only the element 2a is illustrated. Centripetal wire 1 also includes a plurality of bars 3. The bars 3 are inserted in recesses 4 of the bar support element 2a, and the bars are joined to bar support element 2a positively by clamping. As seen in the drawing, the recesses 4 are provided along a longitudinal edge of side 5. The bar support element 2a may be fashioned either as a bar or as a plate. In its initial or final state, as depicted in FIG. 1, the centripetal wire 1 may be described by a specific radius of curvature. For example, the side 5 near the bars 3 may be described by a radius of curvature r.

In its initial state, i.e., at the start of fabricating a centripetal wire 1, the bar support element 2a is made in such a way that it is not subject to any tensions. According to the exemplary embodiment, this means trimming bar support element 2a out from a larger plate with a specific thickness d. The outer dimensions of such a bar support element 2a along the longitudinal edge corresponding to side 5, may be defined by an initial radius of curvature R (not shown in FIG. 1 since FIG. 2 shows the bar support element 2a in the final state) which is smaller than the radius r given in the final state. In this way, the degree of curvature of the longitudinal edge corresponding to side 5 is greater in the initial state than in the final state. In the initial state—not illustrated here—laterally open recesses 4 are characterized by a size and contour such that the laterally open recesses 4 match essentially the size and contour of the bars 3 to be received. Thus, in the initial state, recesses 4 are open sufficiently to receive the bars 3. The laterally open recesses 4 in the area of the outer dimensions of the bar support element 2a are arranged at a specific, defined mutual spacing which is a function of the wire slot widths s to be obtained or achieved.

The wire bars 3 are then inserted in the recesses 4 and joined positively to the bar support element by bending back the radius of curvature of the longitudinal edge of side 5 to the final state, i.e., enlarging said radius of curvature up to r. Thus, in the final state, recesses 4 are sufficiently closed so as to exert a clamping force upon bars 3 retained in recesses 4.

The contour of the recesses 4 depends on the wire bar 3 to be clamped in place and on the intended flexure of the bar support element 2a, that is, upon the intended make, notably the size and curvature, of the wires. Analogously, the recesses 4 are arranged at a specific, defined spacing which depends on the slot width s to be achieved. A further factor is the material used for the bar support element 2a. For the fabrication of flat wires, this means that the bar support element 2a is bent, as against its curvature in the initial state, such that said curvature can in its final state, be described by an element describing a straight line. That is, the longitudinal edge of side 5 would be substantially flat in the final state.

A plurality of bar support elements may be provided for carrying the bars. However, the bar support elements always number at least two.

In the final state illustrated here, that is, in the finished centripetal wire, the side surfaces 6 and 7 of the recess 4 extend at a specific angle relative to an imaginary vertical line. In the initial state, these two sides 6 and 7 extend at a far greater angle relative to the vertical line as compared to such angle in the final state. A planar contact of the outside surfaces 8, or 9, of the bar 3, preferably over the entire side surfaces 6 and 7, occurs only in the final state, i.e., after bending the bar support element 2a back to the final radius of curvature r. Thus, the individual bars 3 possess in their initial state a substantially smaller cross-sectional area than the cross-sectional area described by the recesses 4 in their initial state. In other words, the cross-section of recesses 4 are initially substantially larger than the cross sections of the bars 3 to be received.

The partly funnel-shaped design of the recesses 4 chosen here in the edge area of the bar support element, and the complementary funnel-shaped design of the matching part of the wire bars 3, is a preferred variant. In bending the bar support elements back, this variant enables a planar contact between wire bars 3 and recesses 4. Other makes are conceivable as well, but are considerably less favorable for the clamping effect to be achieved, or other makes may provide no planar contact obtained for the wire bars 3 with the support element 2a in the entire receiving area.

What is claimed is:

1. A method of making a flat wire of the type comprising a plurality of bars in substantially axially parallel arrangement relative to one another and including wire slots contained inbetween, said method comprising the steps of:

providing a plurality of bars;

providing at least two bar support members, wherein each bar support member includes laterally open recesses provided along a longitudinal edge of the bar support member, each said bar support member being in an initial state in which it is not subject to any tensions and wherein the longitudinal edge has an initial radius of curvature such that the laterally open recesses are open sufficiently to receive the bars;

inserting the bars into the laterally open recesses of the bar support members while the bar support members are in the initial state in order to provide a wire shell; and bending the bar support members from the initial state to a final state wherein the longitudinal edge has a final radius of curvature larger than the initial radius of curvature such that the open recesses are sufficiently closed to exert a clamping force upon said bars due to plastic deformation of said bar support members.

2. Method for making a flat wire according to claim 1, characterized in that during said bending step, the bar support members are bent to a flat degree of curvature.

3. Method for making a flat wire according to claim 1 wherein the bars and recesses of the bar support elements are configured for planar contact between the bars and the recesses.

* * * * *